US012794749B2

(12) United States Patent
Guo

(10) Patent No.: US 12,794,749 B2
(45) Date of Patent: Nov. 10, 2026

(54) GUARD GAP CONFIGURATION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Shengxiang Guo, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 18/870,506

(22) PCT Filed: May 31, 2022

(86) PCT No.: PCT/CN2022/096423
§ 371 (c)(1),
(2) Date: Nov. 29, 2024

(87) PCT Pub. No.: WO2023/230901
PCT Pub. Date: Dec. 7, 2023

(65) Prior Publication Data
US 2025/0343720 A1 Nov. 6, 2025

(51) Int. Cl.
*H04L 27/26* (2006.01)
*H04W 52/36* (2009.01)
*H04W 72/0446* (2023.01)

(52) U.S. Cl.
CPC ........ *H04L 27/2666* (2013.01); *H04L 27/261* (2013.01); *H04W 52/365* (2013.01); *H04W 72/0446* (2013.01)

(58) Field of Classification Search
CPC ... H04L 5/0023; H04L 5/0048; H04L 5/0051; H04L 5/0053; H04L 25/0204;
(Continued)

(56) References Cited

U.S. PATENT DOCUMENTS

2019/0115964 A1* 4/2019 Yum .................... H04B 7/0626
2021/0212070 A1* 7/2021 Luo .................... H04W 72/1263
(Continued)

FOREIGN PATENT DOCUMENTS

CN 101502030 A 8/2009
CN 110324906 A 10/2019
(Continued)

OTHER PUBLICATIONS

International Search Report issued Jan. 17, 2023 in PCT/CN2022/096423, filed on May 31, 2022, 4 pages (with English Translation).
(Continued)

*Primary Examiner* — Eva Y Puente
(74) *Attorney, Agent, or Firm* — Oblon, McClelland, Maier & Neustadt, L.L.P.

(57) ABSTRACT

A guard gap configuration method includes sending, based on at least one of channel quality, transmit power information of a terminal, or a configuration request of the terminal, configuration information of a guard gap to the terminal, where the configuration information is used for determining the guard gap between sounding reference signal (SRS) resource sets, and the configuration request is determined by the terminal based on the transmit power information.

15 Claims, 5 Drawing Sheets

(58) Field of Classification Search
CPC ............... H04L 5/0007; H04L 25/0224; H04L 25/0228; H04W 16/14; H04W 24/10; H04W 24/02; H04W 72/0453; H04W 36/0072; H04W 36/00838; H04W 28/0278; H04W 52/365; H04B 17/336; H04B 17/345; H04B 1/525; H04B 1/68; H04B 7/022; H04B 7/0617; H04B 17/309; H04B 17/354; H04B 7/024
See application file for complete search history.

(56) References Cited

U.S. PATENT DOCUMENTS

| | | | | |
|---|---|---|---|---|
| 2022/0085949 | A1 | 3/2022 | Shi et al. | |
| 2022/0393826 | A1* | 12/2022 | Shi | H04W 72/0446 |
| 2023/0163912 | A1* | 5/2023 | Abdelghaffar | H04W 52/0216 370/330 |
| 2023/0179391 | A1* | 6/2023 | He | H04W 28/0284 370/235 |
| 2023/0254080 | A1* | 8/2023 | Gu | H04L 5/0094 |

FOREIGN PATENT DOCUMENTS

| | | | |
|---|---|---|---|
| CN | 110858999 | A | 3/2020 |
| CN | 110891316 | A | 3/2020 |
| CN | 111130742 | A | 5/2020 |
| CN | 111201746 | A | 5/2020 |
| CN | 111867118 | A | 10/2020 |
| CN | 112398618 | A | 2/2021 |
| CN | 112469131 | A | 3/2021 |
| CN | 112491525 | A | 3/2021 |
| CN | 113812113 | A | 12/2021 |
| CN | 113872647 | A | 12/2021 |
| WO | WO 2021/128932 | A1 | 7/2021 |
| WO | WO-2021/159257 | A1 | 8/2021 |
| WO | WO 2022/031450 | A1 | 2/2022 |
| WO | WO-2022/043970 | A1 | 3/2022 |
| WO | WO 2022/077322 | A1 | 4/2022 |

OTHER PUBLICATIONS

Huawei, "Open issues related to SRS configuration procedure", 3GPP TSG-RAN3 Meeting #108, R3-203600, Jun. 2020, 5 pages.
Jun et al., "Improved LTE—a uplink sounding reference signal channel estimation algorithm", Guangdong Communications Technology, Technical Exchange, Oct. 2017, 10 pages (with English translation).
Combined Chinese Office Action and Search Report issued Jun. 20, 2025 in Chinese Patent Application No. 202280002060.X (with English translation), 21 pages.
Chinese Notice of Allowance issued Oct. 27, 2025 in Chinese Patent Application No. 202280002060.X (with English translation), 5 pages.

* cited by examiner

GUARD GAP CONFIGURATION METHOD AND APPARATUS, AND COMMUNICATION DEVICE AND STORAGE MEDIUM

CROSS-REFERENCE TO RELATED APPLICATION

The present application is a U.S. National Stage of International Application No. PCT/CN2022/096423, filed on May 31, 2022, the entire content of which is incorporated herein by reference for all purposes.

TECHNICAL FIELD

The present disclosure relates to, but is not limited to, the field of wireless communication technologies, and in particular relates to a guard gap configuration method and apparatus, a communication device and a storage medium.

BACKGROUND

In wireless communications, in order to enable a base station to obtain channel quality of a terminal, the terminal typically needs to transmit a sounding reference signal (SRS). The more antennas of the terminal that can participate in sending the SRS, the more accurate the channel estimation will be, and thus the higher the rate can be obtained.

In a 5th generation mobile communication technology (abbreviated as 5G) communication system, an alternate sending mechanism of the SRS is introduced, i.e., in the case of a plurality of antennas, SRS resources are alternately sent through antenna switching.

In order to support the alternate sending of more antennas, an SRS resource set is introduced in the 5G communication system, and some user equipment (UEs) can support a plurality of SRS resource sets according to capability of the UE.

SUMMARY

Embodiments of the present disclosure provide a guard gap configuration method and apparatus, a communication device and a storage medium.

A first aspect of the embodiments of the present disclosure provides a guard gap configuration method. The method is performed by a network device, and includes:

sending, based on at least one of channel quality, transmit power information of a terminal, and a configuration request of the terminal, configuration information of a guard gap to the terminal, where the configuration information is used for determining the guard gap between SRS resource sets, and the configuration request is determined by the terminal based on the transmit power information of the terminal.

A second aspect of the embodiments of the present disclosure provides a guard gap configuration method. The method is performed by a terminal, and includes:

receiving configuration information of a guard gap sent by a network device based on at least one of channel quality, transmit power information of the terminal, and a configuration request of the terminal, where the configuration information is used for determining the guard gap between SRS resource sets, and the configuration request is determined by the terminal based on the transmit power information of the terminal.

A third aspect of the embodiments of the present disclosure provides a communication device, including a processor, a memory and an executable program stored in the memory and capable of being run by the processor. The processor, when running the executable program, performs the guard gap configuration method provided in the first aspect or the second aspect.

A fourth aspect of the embodiments of the present disclosure provides a computer storage medium. The computer storage medium stores an executable program. The executable program, when executed by a processor, is capable of implementing the guard gap configuration method provided in the first aspect or the second aspect.

It should be understood that the above general description and the subsequent detailed description are merely exemplary and explanatory, and do not limit the embodiments of the present disclosure.

BRIEF DESCRIPTION OF THE DRAWINGS

The accompanying drawings herein, which are incorporated into and form a part of the specification, illustrate the embodiments that are consistent with the present disclosure and are used in conjunction with the specification to explain principles of the embodiments of the present disclosure.

DETAILED DESCRIPTION

The exemplary embodiments are described in detail here, examples of which are indicated in the accompanying drawings. When the following description involves the accompanying drawings, the same numerals in different accompanying drawings indicate the same or similar elements unless otherwise indicated. The embodiments described in the following exemplary embodiments do not represent all embodiments consistent with the embodiments of the present disclosure. On the contrary, they are only examples of devices and methods consistent with some aspects of the embodiments of the present disclosure.

The terms used in the embodiments of the present disclosure are used solely for the purpose of describing particular embodiments, but are not intended to limit the embodiments of the present disclosure. The singular forms of "a", "the" and "this" used in the present disclosure are also intended to include the plural form, unless the context clearly indicates other meanings. It should also be understood that the term "and/or" as used in this article refers to and includes any or all possible combinations of one or more of the associated listed items.

It should be understood that although the terms first, second, third, etc. may be used in the embodiments of the present disclosure to describe various types of information, such information should not be limited to these terms. These terms are only used to distinguish the same type of information from one another. For example, without departing from the scope of the embodiments of the present disclosure, the first information may also be referred to as the second information, and similarly, the second information may also be referred to as the first information. Depending on the context, the phrase "if" as used herein may be interpreted as "at the time of . . . ", "when . . . ", or "in response to determining".

It can be understood that the description of the embodiments in the present disclosure emphasizes the differences between the embodiments, and their common items or similarities may be referenced to each other and will not be repeated for the sake of brevity.

Figure 1:
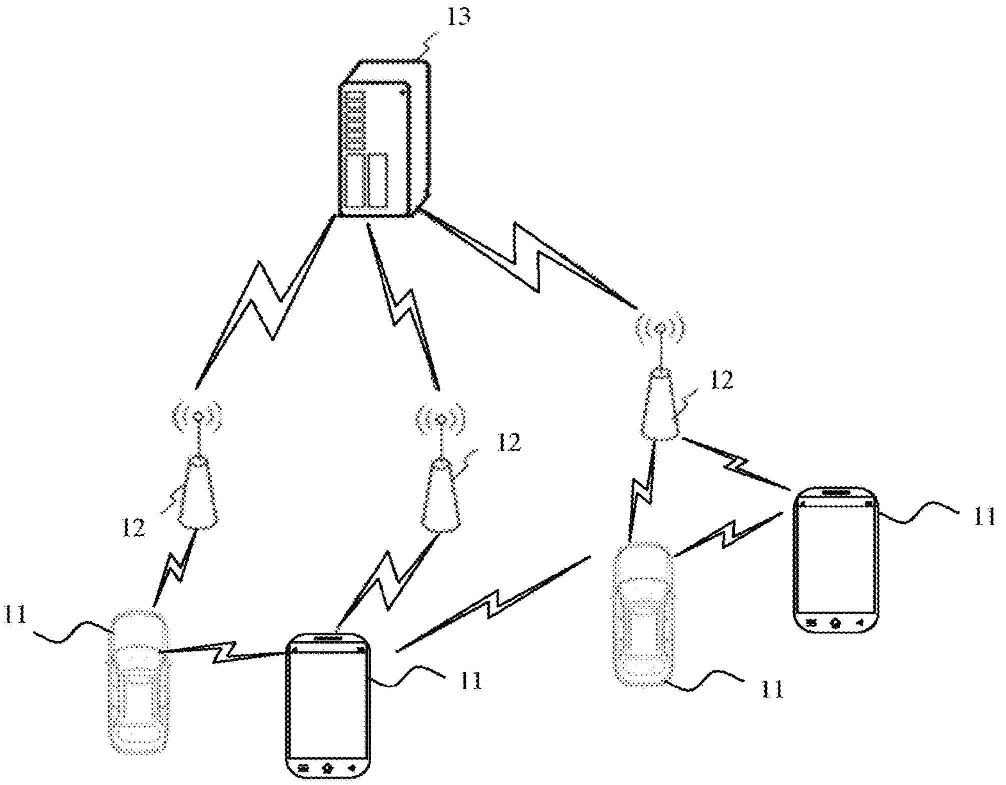
FIG. 1 is a schematic structural diagram of a wireless communication system illustrated according to an exemplary embodiment.

Referring to FIG. 1, a schematic structural diagram of a wireless communication system provided in an embodiment of the present disclosure is shown. As shown in FIG. 1, the wireless communication system is a communication system based on cellular mobile communication technologies, and the wireless communication system may include one or more terminals 11 and one or more network devices 12.

In some embodiments, the terminal 11 may be a device that provides voice and/or data connectivity to a user. The terminal 11 may communicate with one or more core networks via a radio access network (RAN). The terminal 11 may be an IoT (internet of things) UE, such as a sensor device, a mobile phone (or referred to as a "cellular" phone), or a computer with an IoT UE. For example, the terminal 11 may be a fixed, portable, pocket, handheld, computer built-in, or vehicle-mounted device. For example, the terminal 11 may be a station (STA), a subscriber unit, a subscriber station, a mobile station, a mobile, a remote station, an access point, a remote UE (remote terminal), an access UE (access terminal), a user terminal, a user agent, a user device, or a UE. Or, the terminal 11 may be a device of an unmanned aerial vehicle. Or, the terminal 11 may be a vehicle-mounted device, such as a trip computer with wireless communication functions, or a wireless communication device externally connected to a trip computer. Or, the terminal 11 may be a road side device, such as a street light, a signal light, or other road side devices with wireless communication functions.

The network device 12 may be a device configured to communicate with the terminal in the wireless communication system. In some embodiments, the wireless communication system may be a 4th generation mobile communication (4G) system, also referred to as a long term evolution (LTE) system. Or, the wireless communication system may be a 5G system, also referred to as a new radio (NR) system or a 5G NR system. Or, the wireless communication system may be the next generation system of the 5G system. In some embodiments, the access network in the 5G system may be referred to as a new generation-radio access network (NG-RAN). Or, an MTC system.

The network device 12 may be referred to as a wireless access network device, and includes, for example, an access network device, such as a base station (e.g., an access point), which may refer to a device in an access network that communicates with the terminal through one or more cells at the air interface.

In some embodiments, the network device 12 may be an evolved access device (eNB) used in a 4G system. Or, the network device 12 may be an access device (gNB) with a centralized distributed architecture in a 5G system. When adopting the centralized distributed architecture, the network device 12 typically includes a central unit (CU) and at least two distributed units (DUs). The central unit is provided with a protocol stack of a packet data convergence protocol (PDCP) layer, a radio link control (RLC) layer, and a media access control (MAC) layer. The distributed unit is provided with a protocol stack of a physical (PHY) layer. The embodiments of the present disclosure do not limit the specific implementations of the network device 12.

A wireless connection may be established between the network device 12 and the terminal 11 via a wireless air interface. In a different embodiment, the wireless air interface is a wireless air interface based on a 4G standard. Or, the wireless air interface is a wireless air interface based on a 5G standard, for example, the wireless air interface is a new air interface. Or, the wireless air interface may also be a wireless air interface based on the next generation mobile communication network technology standard of 5G.

Optionally, an end to end (E2E) or device to device (D2D, terminal to terminal) connection may also be established between terminals 11, for example, in scenarios such as vehicle to vehicle (V2V) communications, vehicle to infrastructure (V2I) communications, and vehicle to pedestrian (V2P) communications in the vehicle to everything (V2X) communications.

In some embodiments, when a connection is established between the terminals, if one or more of the terminals function as base stations in the communication between the terminals, the one or more terminals may also be regarded as the above-described network devices, and other terminals may be regarded as the above-described terminals 11. For example, in a V2X scenario, vehicle-mounted terminal A reports its capability information (e.g., antenna capability information) to another vehicle-mounted terminal B, and vehicle-mounted terminal B controls, based on the capability information, the communication between vehicle-mounted terminal A and vehicle-mounted terminal B, i.e., vehicle-mounted terminal B acts as the head vehicle in the V2X network, at which time, vehicle-mounted terminal B may be regarded as the above-described network device, and vehicle-mounted terminal A may be regarded as the above-described terminal 11.

Optionally, the above-described wireless communication system may further include a network management device 13. One or more network devices 12 are connected to the network management device 13 respectively. In some embodiments, the network management device 13 may be a core network device in the wireless communication system, for example, the network management device 13 may be a mobility management entity (MME) in the evolved packet core (EPC). Alternatively, the network management device may also be other core network devices, such as a service gateway (SGW), a public data network gateway (PGW), a policy and charging rules function (PCRF), or a home subscriber server (HSS). The implementation forms of the network management device 13 are not limited by the embodiments of the present disclosure.

In wireless communications, the network device may allocate one or more SRS resources to the UE for SRS transmission. The UE may be provided with a plurality of antennas for transmitting signals to the network device or receiving signals (e.g., SRS signals or any other signal) from the network device. In the case where the UE supports a plurality of antennas, the SRS resources may be alternately sent through antenna switching.

In order to support the alternate sending of more antennas, an SRS resource set is introduced in the 5G communication system, and some UEs can support a plurality of SRS resource sets according to the capability of the UE. When the UE supports a plurality of SRS resource sets, the plurality of SRS resource sets may not be transmitted in the same slot, and since it takes time for the terminal to switch antenna ports, a certain guard gap needs to be considered between the SRS resource sets. Since the position of the SRS resource set in the slot may be arbitrary, this may lead to the possibility that the time interval between two SRS resource sets is larger than the number of the symbol occupied by the guard gap. In order to avoid resource waste, it has been agreed in the 3rd generation partnership project (3GPP) specification that signals, such as data signals or control signals, may be allowed to be transmitted in the time interval between the SRS resource sets. However, on which antenna these signals are sent depends on the configuration of the guard gap.

Assuming that two SRS resource sets are configured for SRS transmission, the two SRS resource sets are denoted as SRS resource set #1 and SRS resource set #2, each SRS resource set includes two SRS resources, and the two SRS resources are denoted as SRS #1 and SRS #2.

There are multiple configuration schemes to consider for the configuration of the guard gap, and three typical schemes are exemplified below.

Figure 2A:
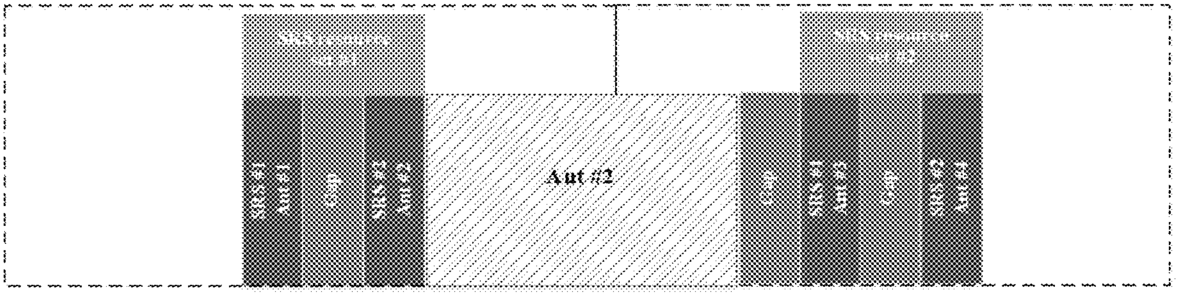
FIG. 2*a* is a schematic diagram of a guard gap configuration illustrated according to an exemplary embodiment.

As shown in FIG. 2*a*, if a Gap between the SRS resource sets is configured before SRS #1 of SRS resource set #2, then antenna 2, i.e., Ant #2 (diagonal shadow in FIG. 2*a*), is used to send signals between the SRS resource sets.

Figure 2B:
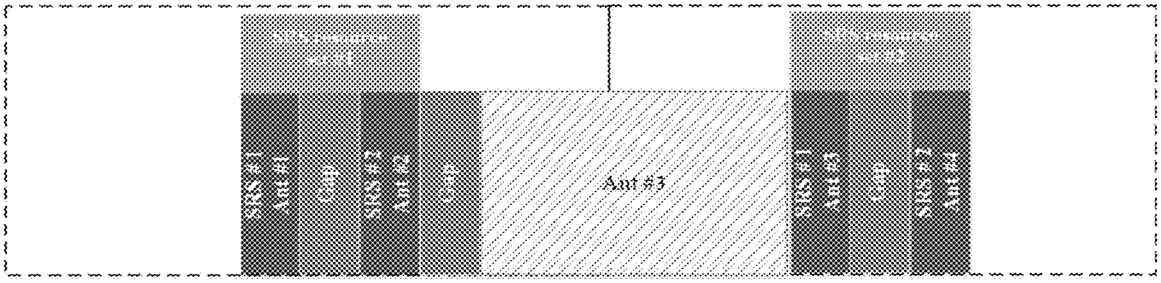
FIG. 2*b* is a schematic diagram of a guard gap configuration illustrated according to an exemplary embodiment.

As shown in FIG. 2*b*, if a Gap between the SRS resource sets is configured after SRS #2 of SRS resource set #1, then antenna 3, i.e., Ant #3 (diagonal shadow in FIG. 2*b*), is used to send signals between the SRS resource sets.

Figure 2C:
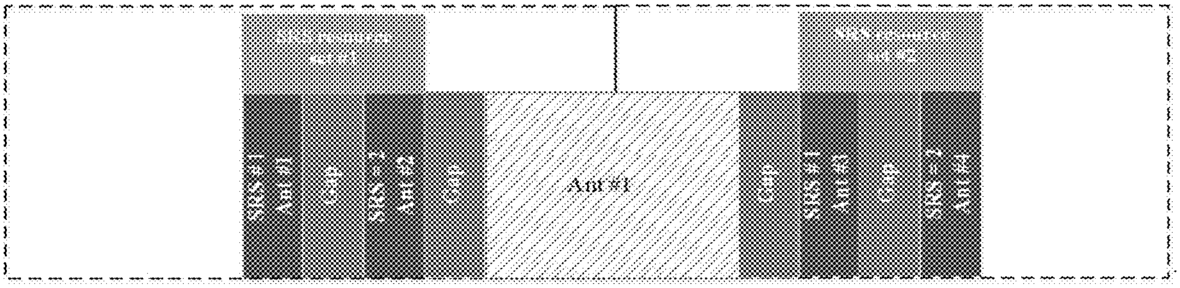
FIG. 2*c* is a schematic diagram of a guard gap configuration illustrated according to an exemplary embodiment.

As shown in FIG. 2*c*, if a Gap between the SRS resource sets is configured after SRS #2 of SRS resource set #1, and at the same time, another Gap is configured before SRS #1 of SRS resource set #2, then it may be switched to the optimal antenna, such as antenna 1, i.e., Ant #1 (diagonal shadow in FIG. 2*c*), to send signals between the SRS resource sets.

The configuration scheme of the guard gap shown in FIG. 2*c* can ensure that the transmitted signal between the SRS resource sets is transmitted on the optimal antenna, which provides the maximum transmit power while improving the transmit efficiency of the power. However, the configuration of an additional guard gap is required, which leads to some resource waste. Therefore, the configuration scheme of the guard gap shown in FIG. 2*c* is suitable for the case where the UE is at the edge of the cell and the number of symbols between the SRS resource sets is relatively high. The configuration scheme of the guard gap shown in FIG. 2*a* is relatively similar to the configuration scheme of the guard gap shown in FIG. 2*b*, but relatively speaking, the configuration scheme of the guard gap shown in FIG. 2*a* is superior to the configuration scheme of the guard gap shown in FIG. 2*b*, due to the fact that antenna 2 in general has a better performance than antenna 3.

Figure 3:
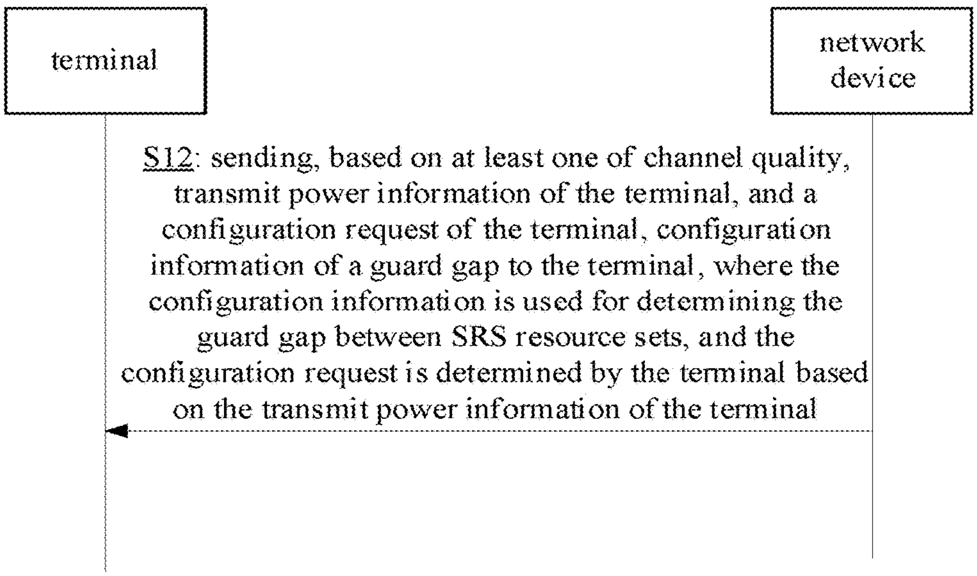
FIG. 3 is a schematic flow diagram of a guard gap configuration method illustrated according to an exemplary embodiment.

FIG. 3 is a schematic flow diagram of a guard gap configuration method illustrated according to an exemplary embodiment. The guard gap configuration method is performed by the network device in the wireless communication system shown in FIG. 1.

As shown in FIG. 3, the guard gap configuration method may include the following step S12.

At S12, configuration information of a guard gap is sent to a terminal based on at least one of channel quality, transmit power information of the terminal, and a configuration request of the terminal, where the configuration information is used for determining the guard gap between SRS resource sets, and the configuration request is determined by the terminal based on the transmit power information of the terminal.

The guard gap configuration method is performed by a network device, and the network device may be a base station, for example, the network device may be a base station (or gNB) in a 5G system.

The configuration information of the guard gap at least indicates a time domain position of the guard gap.

In some embodiments, the guard gap between two adjacent SRS resource sets is configured in a time interval between the two adjacent SRS resource sets. The number of time domain units occupied by the guard gap is less than or equal to the number of time domain units occupied by the time interval.

The configuration information of the guard gap includes at least one configuration parameter of the guard gap. The at least one parameter includes, but is not limited to, the position of the guard gap, the number of the guard gap, the time domain unit to be occupied by the guard gap, etc.

In some embodiments, the time domain unit may be a symbol or a mini-slot. The symbol is, for example, an orthogonal frequency division multiplexing (OFDM) symbol. In some embodiments, one guard gap may be configured to occupy one OFDM symbol or two consecutive OFDM symbols.

When the antenna switching of the terminal is used for signal transmission between the SRS resource sets, one or more symbols that are not occupied by the guard gap in the time interval between two adjacent SRS resource sets may be used for the signal transmission. The signal transmission is used for transmitting a data signal or a control signal.

In some examples, the channel quality may be uplink channel quality, and the network device may estimate, based on the sounding reference signal sent by the terminal, the uplink channel quality of different frequency bands.

In some examples, the uplink channel quality may be characterized by using a quality parameter of the uplink channel. The quality parameter of the uplink channel may include at least one of the following: signal to interference plus noise ratio (SINR), reference signal receiving power (RSRP), received signal strength indicator (RSSI), reference signal receiving quality (RSRQ), etc.

In an embodiment, the method further includes:

receiving the transmit power information of the terminal sent by the terminal.

The transmit power information of the terminal is sent by the terminal to the network device. For example, the terminal may send the transmit power information of the terminal to the network device via a medium accesscontrol control element (MAC CE).

In other examples, the transmit power information of the terminal may be used for determining transmit power of the terminal.

Exemplarily, the transmit power information may include at least one of the following:

the maximum transmit power information of the terminal;
the residual transmit power information of the terminal;
the power headroom report (PHR) of the terminal.

Exemplarily, the power headroom report of the terminal is sent by the terminal to the network device. For example, the terminal may send the power headroom report of the terminal to the network device via an MAC CE. The power headroom report includes power headroom of the terminal. The power headroom is a difference between the maximum transmission power allowed by the terminal and the physical uplink shared channel (PUSCH) transmission power obtained through evaluation currently.

For example, in the terminal, the power headroom report may be configured to be triggered in two ways, including: being triggered periodically through a preset period PHR timer or being triggered based on a change event in path loss. After triggering the power headroom report, the terminal actively reports the power headroom report to the network device.

As another example, the power headroom report may be a power headroom report generated by the terminal in response to a power headroom report request instruction of the network device, and the power headroom report is reported to the network device, where the power headroom report request instruction of the network device may be sent to the terminal by the network device upon access of the terminal.

In an embodiment, the method further includes:

receiving the configuration request sent by the terminal, where the configuration request is determined by the terminal based on the transmit power information of the terminal.

For example, the terminal may send the configuration request of the terminal to the network device via an MAC CE. In some examples, the configuration request of the terminal may be used for characterizing whether the transmit power of the terminal is greater than a preset transmit power threshold.

The embodiments of the present disclosure provide a guard gap configuration method that is performed by a network device and may include sending, based on channel quality, configuration information of a guard gap to the terminal.

The embodiments of the present disclosure provide a guard gap configuration method that is performed by a network device and may include sending, based on transmit power information of a terminal, configuration information of a guard gap to the terminal.

The embodiments of the present disclosure provide a guard gap configuration method that is performed by a network device and may include sending, based on a configuration request of a terminal, configuration information of a guard gap to the terminal, where the configuration request is determined by the terminal based on the transmit power information of the terminal.

The embodiments of the present disclosure provide a guard gap configuration method that is performed by a network device and may include sending, based on channel quality and transmit power information of a terminal, configuration information of a guard gap to the terminal.

The embodiments of the present disclosure provide a guard gap configuration method that is performed by a network device and may include sending, based on channel quality and a configuration request of a terminal, configuration information of a guard gap to the terminal, where the configuration request is determined by the terminal based on the transmit power information of the terminal.

The embodiments of the present disclosure provide a guard gap configuration method that is performed by a network device and may include sending, based on transmit power information of a terminal, and a configuration request of the terminal, configuration information of a guard gap to the terminal, where the configuration request is determined by the terminal based on the transmit power information of the terminal.

The embodiments of the present disclosure provide a guard gap configuration method that is performed by a network device and may include sending, based on channel quality, transmit power information of a terminal, and a configuration request of the terminal, configuration information of a guard gap to the terminal, where the configuration request is determined by the terminal based on the transmit power information of the terminal.

The embodiments of the present disclosure provide a guard gap configuration method that is performed by a network device and may include: receiving transmit power information of a terminal sent by the terminal; and sending, based on the transmit power information of the terminal, configuration information of a guard gap to the terminal.

The embodiments of the present disclosure provide a guard gap configuration method that is performed by a network device and may include: receiving transmit power information of a terminal, and a configuration request determined by the terminal based on the transmit power information of the terminal that are sent by the terminal; and sending, based on at least one of the transmit power information of the terminal, channel quality, and the configuration request of the terminal, configuration information of a guard gap to the terminal.

The embodiments of the present disclosure provide a guard gap configuration method that is performed by a network device and may include: receiving transmit power information of a terminal sent by the terminal; and sending, based on the transmit power information of the terminal, configuration information of a guard gap to the terminal.

The embodiments of the present disclosure provide a guard gap configuration method that is performed by a network device and may include: receiving a configuration request sent by a terminal, where the configuration request is determined by the terminal based on the transmit power information of the terminal; and sending, based on the configuration request, configuration information of a guard gap to the terminal.

The embodiments of the present disclosure provide a guard gap configuration method that is performed by a network device and may include: receiving transmit power information of a terminal sent by the terminal; and sending, based on channel quality and the transmit power information of the terminal, configuration information of a guard gap to the terminal.

The embodiments of the present disclosure provide a guard gap configuration method that is performed by a network device and may include: receiving a configuration request sent by a terminal, where the configuration request is determined by the terminal based on the transmit power information of the terminal; and sending, based on channel quality and the configuration request, configuration information of a guard gap to the terminal.

The embodiments of the present disclosure provide a guard gap configuration method that is performed by a network device and may include: receiving transmit power information of a terminal and a configuration request of the terminal, where the configuration request is determined by the terminal based on the transmit power information of the terminal; and sending, based on the transmit power information and the configuration request of the terminal, configuration information of a guard gap to the terminal.

The embodiments of the present disclosure provide a guard gap configuration method that is performed by a network device and may include: receiving transmit power information of a terminal and a configuration request of the terminal, where the configuration request is determined by the terminal based on the transmit power information of the terminal; and sending, based on channel quality, and the transmit power information and the configuration request of the terminal, configuration information of a guard gap to the terminal.

In the above step S12, sending, based on at least one of the channel quality, the transmit power information of the terminal, and the configuration request of the terminal, the configuration information of the guard gap to the terminal may include at least one of:

sending, based on a comparison result between the channel quality and a preset quality threshold, the configuration information of the guard gap to the terminal;

sending, based on a comparison result between the transmit power of the terminal and a preset transmit power threshold, the configuration information of the guard gap to the terminal;

sending, based on a comparison result between the power headroom of the terminal and a preset headroom threshold, the configuration information of the guard gap to the terminal;

sending, based on a comparison result between the preset transmit power threshold and the transmit power of the terminal characterized by the configuration request of the terminal, the configuration information of the guard gap to the terminal.

In the above step S12, the network device may send the configuration information of the guard gap to the terminal via radio resource control (RRC) signaling or MAC layer signaling (e.g., MAC-CE) and/or downlink control information (DCI).

In the guard gap configuration method provided by the embodiments of the present disclosure, the network device sends, based on at least one of the channel quality, the transmit power information of the terminal, and the configuration request of the terminal, the configuration information of the guard gap to the terminal. In this way, the network device is capable of dynamically configuring the guard gap between the SRS resource sets for the terminal. Compared to the network device allocating the same guard gap between the SRS resource sets for all terminals, the embodiments of the present disclosure can reduce the phenomenon of network resource waste and/or poor communication quality of the terminal caused by the unreasonable configuration of the guard gap, improve the communication quality of the terminal, and reduce the network resource waste.

In an embodiment, the configuration information includes:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets;

second configuration information, where the second configuration information is different from the first configuration information.

In some embodiments, the first configuration information is specifically used for indicating that a first guard gap and a second guard gap are provided between two adjacent SRS resource sets, the first guard gap is adjacent to the last SRS resource of the first SRS resource set of the two adjacent SRS resource sets, and that the second guard gap is adjacent to the first SRS resource of the second SRS resource set of the two adjacent SRS resource sets.

Referring to FIG. 2*c*, the first guard gap (Gap) configured between SRS resource set #1 and SRS resource set #2 is adjacent to SRS #2 in SRS resource set #1 and located after SRS resource set #1; and the second guard gap (Gap) configured between SRS resource set #1 and SRS resource set #2 is adjacent to SRS #1 in SRS resource set #2 and located before SRS resource set #2.

The number of the time domain unit occupied by the first guard gap between two adjacent SRS resource sets, and the number of the time domain unit occupied by the second guard gap between the two adjacent SRS resource sets may be the same. The time domain unit may be a symbol or a mini-slot.

Exemplarily, taking the time domain unit being a symbol as an example, the first guard gap and the second guard gap may both occupy one symbol; that is, the first guard gap may be set at the first symbol after the end timepoint of the first SRS resource set, and the second guard gap may be set at the last symbol before the start timepoint of the second SRS resource set.

It can be understood that the number of the time domain unit occupied by the first guard gap, and the number of the time domain unit occupied by the second guard gap may also be different, e.g., the first guard gap occupies one symbol, and the second guard gap occupies two consecutive symbols.

In some examples, the number of the time domain unit occupied by the guard gap between two adjacent SRS resource sets may be determined based on the sub-carrier space (SCS) used for SRS transmission.

In some embodiments, the second configuration information is different from the first configuration information.

In an embodiment, the second configuration information is used for indicating that a guard gap is configured before the start timepoint of the second SRS resource set of the two adjacent ones of the SRS resource sets, or is configured after the end timepoint of the first SRS resource set of the two adjacent ones of the SRS resource sets.

In an example, the second configuration information indicates that there is only one guard gap located between two adjacent SRS resource sets, and that the guard gap is adjacent to the last SRS resource of the first SRS resource set of the two adjacent SRS resource sets.

For example, the second configuration information indicates that a guard gap is configured at the first symbol after the end timepoint of the first SRS resource set of the two adjacent SRS resource sets.

Referring to FIG. 2*b*, one guard gap (Gap) configured between SRS resource set #1 and SRS resource set #2 is adjacent to SRS #2 in SRS resource set #1 and located after SRS resource set #1.

In another example, the second configuration information indicates that there is only one guard gap located between two adjacent SRS resource sets, and that the guard gap is adjacent to the first SRS resource of the second SRS resource set of the two adjacent SRS resource sets.

For example, the second configuration information indicates that a guard gap is set at the last OFDM symbol or the last two OFDM symbols before the start timepoint of the second SRS resource set in two adjacent SRS resource sets.

Referring to FIG. 2*a*, one guard gap (Gap) configured between SRS resource set #1 and SRS resource set #2 is adjacent to SRS #1 in SRS resource set #2 and located before SRS resource set #2.

In an embodiment, sending, based on at least one of the channel quality, the transmit power information of the terminal, and the configuration request of the terminal, the configuration information of the guard gap to the terminal in step S12 may include:

- sending, based on the number of the time domain unit between the SRS resource sets and at least one of the channel quality, the transmit power information of the terminal, and the configuration request of the terminal, the configuration information of the guard gap to the terminal.

In an embodiment, sending, based on the number of the time domain unit between the SRS resource sets and at least one of the channel quality, the transmit power information of the terminal, and the configuration request of the terminal, the configuration information of the guard gap to the terminal includes at least one of the following manners 1 to 7.

In manner 1, the channel quality is less than a quality threshold, the number of the time domain unit between the SRS resource sets is greater than a number threshold, and the first configuration information is sent to the terminal.

The network device may pre-configure the number of the time domain unit of the time interval between the SRS resource sets.

In some embodiments, the number of the time domain unit of the time interval between two adjacent SRS resource sets specifically refers to the number of the symbol of the time interval between the two adjacent SRS resource sets.

The network device may preset the quality threshold of the channel quality and the number threshold of the time domain unit, compare the channel quality with the quality threshold, and compare the number of the time domain unit between the SRS resource sets with the number threshold.

When the channel quality is less than the quality threshold, and the number of the time domain unit between the SRS resource sets is greater than the number threshold, the network device sends the first configuration information to the terminal.

In this embodiment, the channel quality being less than the quality threshold indicates that the channel quality is relatively poor, for example, the terminal is at the edge of the cell coverage or in the weak signal environment; and the number of the time domain unit between the SRS resource sets being greater than the number threshold indicates that there are relatively more time domain resources between the SRS resource sets.

Accordingly, the first configuration information may be sent to the terminal by the network device, indicating the terminal to configure a guard gap after the end timepoint of the first SRS resource set of two adjacent SRS resource sets, and configure a guard gap before the start timepoint of the second SRS resource set of the two adjacent SRS resource sets.

In this way, when the terminal performs antenna switching, the antenna used for signal transmission between the SRS resource sets is different from the antenna used for transmission of the last SRS resource in the first SRS resource set, and also different from the antenna used for transmission of the first SRS resource in the second SRS resource set.

Therefore, in the case where the last SRS resource in the first SRS resource set is transmitted through antenna 2, and the first SRS resource in the second SRS resource set is transmitted through antenna 3, sending the first configuration information to the terminal by the network device can enable the terminal to switch to antenna 1 with the optimal performance for signal transmission between the resource sets.

In manner 2, the channel quality is greater than or equal to the quality threshold, and the second configuration information is sent to the terminal.

The network device may compare the channel quality with the preset quality threshold, and when the channel quality is greater than or equal to the quality threshold, the network device sends the second configuration information to the terminal.

In this embodiment, the channel quality being greater than or equal to the quality threshold indicates that the channel quality is relatively good. Sending the second configuration information to the terminal by the network device indicates the terminal to configure a guard gap before the start timepoint of the second SRS resource set of two adjacent SRS resource sets. This enables the terminal to use the same antenna for the transmission of the last SRS resource in the first SRS resource set and the signal transmission between the SRS resource sets.

Therefore, in the case where the last SRS resource in the first SRS resource set is transmitted through antenna 2, sending the second configuration information to the terminal by the network device can enable the terminal to achieve signal transmission between the first SRS resource set and the second SRS resource set through antenna 2.

Since the performance of antenna 2 is second only to the performance of antenna 1 among the plurality of antennas of the terminal, it can ensure that the transmitted signal between the SRS resource sets can be transmitted through the relatively optimal antenna. In addition, due to the second configuration information indicating that the terminal only configures one guard gap between two adjacent SRS resource sets, it can reduce the waste of time domain resources between the SRS resource sets.

In manner 3, the number of the time domain unit between the SRS resource sets is less than or equal to the number threshold, and the second configuration information is sent to the terminal.

The network device may compare the number of the time domain unit between the SRS resource sets with the preset number threshold, and when the number of the time domain unit between the SRS resource sets is less than or equal to the preset number threshold, the network device sends the second configuration information to the terminal.

In this embodiment, the number of the time domain unit between the SRS resource sets being less than or equal to the number threshold indicates that there are relatively few time domain resources between the SRS resource sets. Sending the second configuration information to the terminal by the network device indicates the terminal to configure a guard gap before the start timepoint of the second SRS resource set of two adjacent SRS resource sets or after the end timepoint of the first SRS resource set of the two adjacent SRS resource sets. In this way, only one guard gap is configured between two adjacent SRS resource sets, which can reduce the waste of time domain resources between the SRS resource sets.

Furthermore, in the case where the second configuration information indicates the terminal to configure a guard gap before the start timepoint of the second SRS resource set of two adjacent SRS resource sets, the terminal can be enabled to use the same antenna for the transmission of the last SRS resource in the first SRS resource set and the signal transmission between the SRS resource sets.

Therefore, in the case where the last SRS resource in the first SRS resource set is transmitted through antenna 2, the terminal can be enabled to achieve signal transmission between the first SRS resource set and the second SRS resource set through antenna 2. Since the performance of antenna 2 is second only to the performance of antenna 1 among the plurality of antennas of the terminal, it can ensure that the transmitted signal between the SRS resource sets can be transmitted through the relatively optimal antenna.

In manner 4, the transmit power of the terminal is greater than a preset power threshold, the number of the time domain unit between the SRS resource sets is greater than the number threshold, and the first configuration information is sent to the terminal.

The network device may preset the power threshold and the number threshold of the time domain unit, compare the transmit power of the terminal with the preset power threshold, and compare the number of the time domain unit between the SRS resource sets with the number threshold.

When the transmit power of the terminal is greater than the preset power threshold, and the number of the time domain unit between the SRS resource sets is greater than the number threshold, the network device sends the first configuration information to the terminal.

In this embodiment, the transmit power of the terminal being greater than the preset power threshold indicates that the terminal is at the edge of the cell coverage or in the weak signal environment, and that it is necessary to use an antenna with better performance for signal transmission; and the number of the time domain unit between the SRS resource sets being greater than the number threshold indicates that there are relatively more time domain resources between the SRS resource sets.

Accordingly, the first configuration information may be sent to the terminal by the network device, indicating the terminal to configure a guard gap after the end timepoint of the first SRS resource set of two adjacent SRS resource sets, and configure a guard gap before the start timepoint of the second SRS resource set of the two adjacent SRS resource sets.

Therefore, in the case where the last SRS resource in the first SRS resource set is transmitted through antenna 2, and the first SRS resource in the second SRS resource set is transmitted through antenna 3, the terminal can be enabled to switch to antenna 1 with the optimal performance for signal transmission between the SRS resource sets.

In manner 5, the transmit power of the terminal is less than or equal to the preset power threshold, and the second configuration information is sent to the terminal.

The network device may compare the transmit power of the terminal with the preset power threshold, and when the transmit power is less than or equal to the preset power threshold, the network device sends the second configuration information to the terminal.

In this embodiment, when the transmit power of the terminal is less than or equal to the preset power threshold, sending the second configuration information to the terminal by the network device indicates the terminal to configure a guard gap before the start timepoint of the second SRS resource set of two adjacent SRS resource sets, or configure a guard gap after the end timepoint of the first SRS resource set of the two adjacent SRS resource sets. This enables the terminal to configured only one guard gap between two adjacent SRS resource sets, which can reduce the waste of time domain resources between the SRS resource sets.

In manner 6, the power headroom of the terminal is less than or equal to a headroom threshold, the number of the time domain unit between the SRS resource sets is greater than the number threshold, and the first configuration information is sent to the terminal.

The network device may compare the power headroom of the terminal with the preset headroom threshold, compare the transmit power of the terminal with the preset power threshold, and compare the number of the time domain unit between the SRS resource sets with the number threshold.

When the power headroom is less than or equal to the headroom threshold, and the number of the time domain unit between the SRS resource sets is greater than the number threshold, the network device sends the first configuration information to the terminal.

In this embodiment, sending the first configuration information to the terminal by the network device indicates the terminal to configure a guard gap after the end timepoint of the first SRS resource set of two adjacent SRS resource sets, and configure a guard gap before the start timepoint of the second SRS resource set of the two adjacent SRS resource sets.

In this way, in the case where the last SRS resource in the first SRS resource set is transmitted through antenna 2, and the first SRS resource in the second SRS resource set is transmitted through antenna 3, the terminal can be enabled to switch to antenna 1 with the optimal performance for signal transmission between the SRS resource sets.

In manner 7, the power headroom of the terminal is greater than the headroom threshold, and the second configuration information is sent to the terminal.

The network device may compare the power headroom of the terminal with the preset headroom threshold, and when the power headroom of the terminal is greater than the headroom threshold, the network device sends the second configuration information to the terminal.

In this embodiment, when the power headroom of the terminal is greater than the headroom threshold, sending the second configuration information to the terminal by the network device indicates the terminal to configure a guard gap before the start timepoint of the second SRS resource set of two adjacent SRS resource sets, or configure a guard gap after the end timepoint of the first SRS resource set of the two adjacent SRS resource sets. This enables the terminal to configured only one guard gap between two adjacent SRS resource sets, which can reduce the waste of time domain resources between the SRS resource sets.

In an embodiment, sending, based on the number of the time domain unit between the SRS resource sets and at least one of the channel quality, the transmit power information of the terminal, and the configuration request of the terminal, the configuration information of the guard gap to the terminal includes at least one of the following:

when the number of the time domain unit between the SRS resource sets is greater than the number threshold, sending, based on the configuration request, the first configuration information to the terminal;

when the number of the time domain unit between the SRS resource sets is less than or equal to the number threshold, sending, based on the configuration request, the second configuration information to the terminal.

In this embodiment, when the number of the time domain unit between the SRS resource sets is less than or equal to the number threshold, it indicates that there are relatively few time domain resources between the SRS resource sets, and the second configuration information may be sent to the terminal based on the configuration request of the terminal. This enables the terminal to configure only one guard gap between two adjacent SRS resource sets, which can reduce the waste of time domain resources between the SRS resource sets.

When the number of the time domain unit between the SRS resource sets is greater than the number threshold, it indicates that there are relatively more time domain resources between the SRS resource sets. Thus, the first configuration information may be sent to the terminal based on the configuration request of the terminal, enabling the terminal to configure a guard gap after the end timepoint of the first SRS resource set of two adjacent SRS resource sets, and configure a guard gap before the start timepoint of the second SRS resource set of the two adjacent SRS resource sets.

In this way, in the case where the last SRS resource in the first SRS resource set is transmitted through antenna 2, and the first SRS resource in the second SRS resource set is transmitted through antenna 3, the terminal can be enabled to switch to antenna 1 with the optimal performance for signal transmission between the SRS resource sets, thereby ensuring the signal transmission between the SRS resource sets when the terminal is at the edge of the cell coverage or in the weak signal environment.

In an embodiment, sending, based on at least one of the channel quality, the transmit power information of the terminal, and the configuration request of the terminal, the configuration information of the guard gap to the terminal may include:

sending to the terminal, based on the configuration request and according to configuration information of the guard gap that has been sent to the terminal, the configuration information of the guard gap that has not been provided to the terminal.

In some embodiments, the configuration request is determined by the terminal based on the transmit power information of the terminal.

In some examples, the configuration request of the terminal may be used for characterizing whether the transmit power of the terminal is greater than the preset transmit power threshold.

Specifically, according to the configuration information of the guard gap that has been sent to the terminal, the guard gap currently configured by the terminal between the SRS resource sets can be determined; and the configuration information of the guard gap that has not been provided to the terminal is sent to the terminal based on the guard gap currently configured by the terminal between the SRS resource sets, and the configuration request of the terminal.

In an embodiment, sending to the terminal, based on the configuration request and according to the configuration information of the guard gap that has been sent to the terminal, the configuration information of the guard gap that has not been provided to the terminal may include:

in response to having sent to the terminal the first configuration information of the guard gap, sending to the terminal, based on the configuration request, the second configuration information of the guard gap that has not been provided to the terminal; and in response to having sent to the terminal the second configuration information of the guard gap, sending to the terminal, based on the configuration request, the first configuration information of the guard gap that has not been provided to the terminal.

Specifically, according to the fact that the first configuration information of the guard gap has been sent to the terminal, it may be determined that the terminal is currently configured with a number of two guard gaps between the SRS resource sets, and the second configuration information of the guard gap that has not been provided to the terminal may be sent to the terminal based on the configuration request, indicating the terminal to configure a guard gap before the start timepoint of the second SRS resource set of two adjacent SRS resource sets, or configure a guard gap after the end timepoint of the first SRS resource set of the two adjacent SRS resource sets.

Specifically, according to the fact that the second configuration information of the guard gap has been sent to the terminal, it may be determined that the terminal is currently configured with a number of one guard gap between the SRS resource sets; and in the case where the number of the time domain unit between the SRS resource sets is greater than the preset number threshold, the first configuration information of the guard gap that has not been provided to the terminal may be sent to the terminal based on the configuration request, indicating the terminal to configure a guard gap after the end timepoint of the first SRS resource set of two adjacent SRS resource sets, and configure a guard gap before the start timepoint of the second SRS resource set of the two adjacent SRS resource sets.

Figure 4:
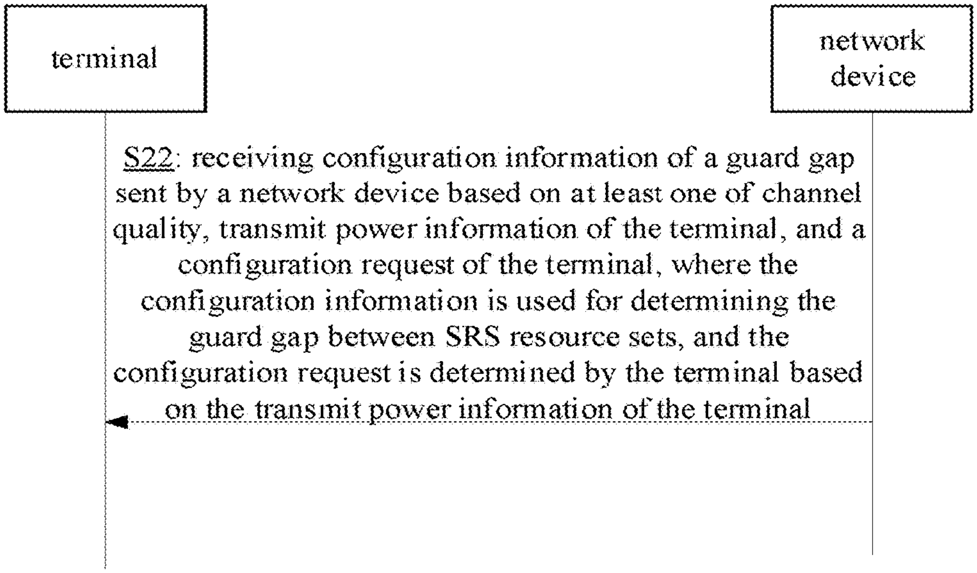
FIG. 4 is a schematic flow diagram of a guard gap configuration method illustrated according to an exemplary embodiment.

FIG. 4 is a schematic flow diagram of a guard gap configuration method illustrated according to an exemplary embodiment. The guard gap configuration method may be applied to the terminal in the wireless communication system shown in FIG. 1. As shown in FIG. 4, the method may include the following step S22.

At S22, configuration information of a guard gap sent by a network device based on at least one of channel quality, transmit power information of the terminal, and a configuration request of the terminal is received, where the configuration information is used for determining the guard gap between SRS resource sets, and the configuration request is determined by the terminal based on the transmit power information of the terminal.

Specifically, the terminal may receive the configuration information of the guard gap sent by the network device via RRC signaling, MAC layer signaling, and/or DCI.

In the guard gap configuration method provided by the embodiments of the present disclosure, the terminal receives the configuration information of the guard gap sent by the network device based on at least one of the channel quality, the transmit power information of the terminal, and the configuration request of the terminal. In this way, the terminal is capable of dynamically configuring, based on the configuration information of the guard gap sent by the network device, the guard gap between the SRS resource sets. This can reduce the phenomenon of network resource waste and/or poor communication quality of the terminal caused by the unreasonable configuration of the guard gap, improve the communication quality of the terminal, and reduce the network resource waste.

In an embodiment, the configuration information includes:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets;

second configuration information, where the second configuration information is different from the first configuration information.

In an embodiment, the second configuration information is used for indicating that a guard gap is configured before the start timepoint of the second SRS resource set of the two adjacent ones of the SRS resource sets, or is configured after the end timepoint of the first SRS resource set of the two adjacent ones of the SRS resource sets.

In an embodiment, receiving the configuration information of the guard gap sent by the network device based on at least one of the channel quality, the transmit power information of the terminal, and the configuration request of the terminal includes:

receiving the configuration information of the guard gap sent by the network device based on the number of the time domain unit between the SRS resource sets and at least one of the channel quality, the transmit power information of the terminal, and the configuration request of the terminal.

Figure 5:
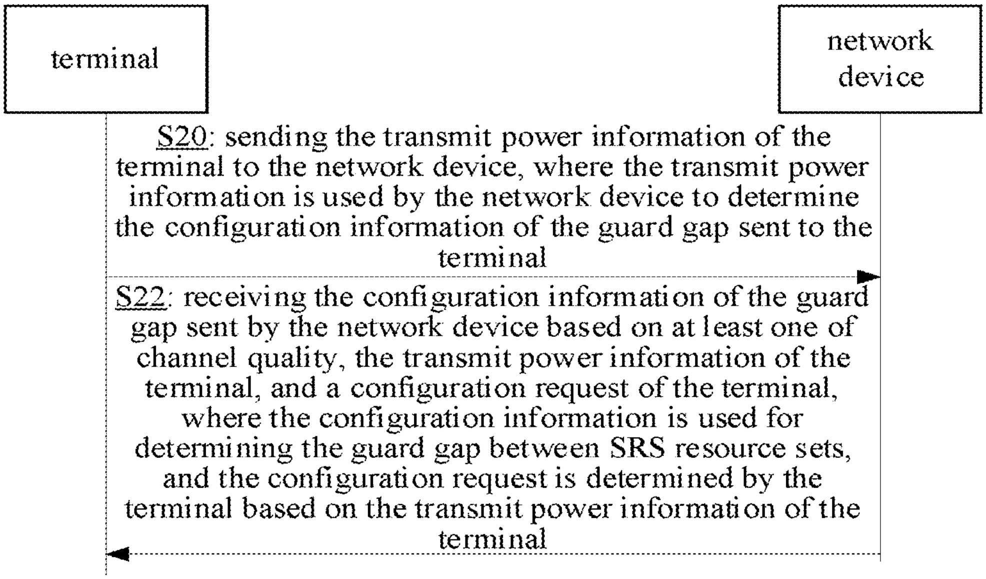
FIG. 5 is a schematic flow diagram of a guard gap configuration method illustrated according to an exemplary embodiment.

In an embodiment, as shown in FIG. 5, based on FIG. 4, the method may further include the following step S20.

At S20, the transmit power information of the terminal is sent to the network device; where the transmit power information is used by the network device to determine the configuration information of the guard gap sent to the terminal.

Figure 6:
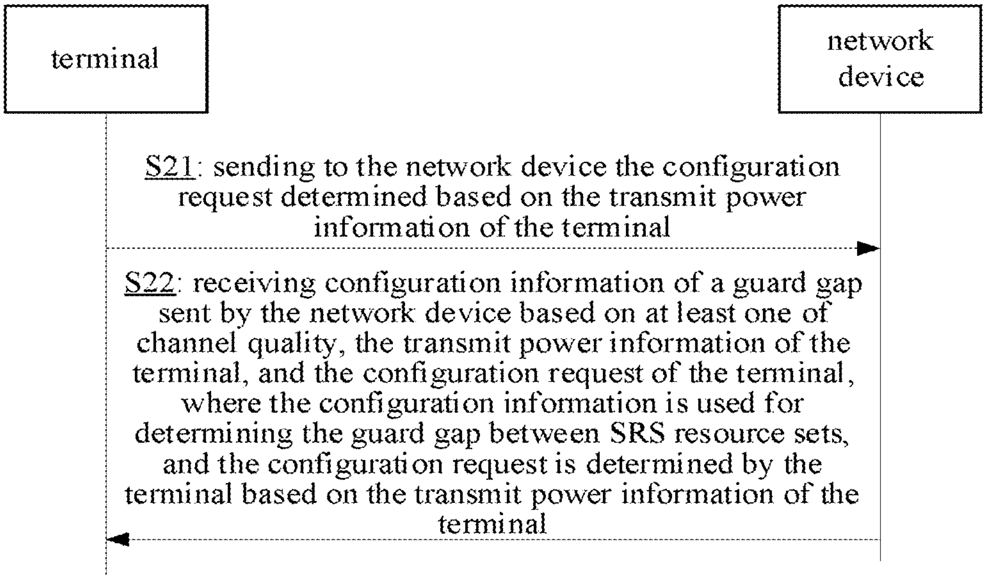
FIG. 6 is a schematic flow diagram of a guard gap configuration method illustrated according to an exemplary embodiment.

In an embodiment, as shown in FIG. 6, based on FIG. 4, the method further include the following step S21.

At S21, the configuration request determined based on the transmit power information of the terminal is sent to the network device.

In some examples, the transmit power information of the terminal may be the transmit power of the terminal itself.

In other examples, the transmit power information of the terminal may be used for determining the transmit power of the terminal.

The transmit power information may include at least one of the following:

the maximum transmit power information of the terminal;
the residual transmit power information of the terminal;
the power headroom report (PHR) of the terminal.

The terminal determines a comparison result between the transmit power of the terminal and the preset power threshold and, based on the comparison result, determines the configuration request to be sent to the network device.

In an embodiment, the method further includes:

determining the configuration request based on the transmit power information of the terminal.

In some examples, the configuration request may be used for characterizing whether the transmit power of the terminal is greater than the preset transmit power threshold.

In an embodiment, sending the configuration request to the network device based on the transmit power information of the terminal, as described in step S21 above, include at least one of the following manners 1 to 4.

In manner 1, configuration information of the guard gap that has been received by the terminal is the first configuration information, and the transmit power of the terminal is less than or equal to the preset power threshold, the configuration request is sent to the network device.

The configuration information of the guard gap that has been received by the terminal being the first configuration information may determine that the number of guard gaps currently configured by the terminal between the SRS resource sets is two. When the transmit power of the terminal is less than or equal to the preset power threshold, the terminal requests, by sending the configuration request to the network device, the network device to configure the terminal with only one guard gap between two adjacent SRS resource sets, which reduces the waste of time domain resources between the SRS resource sets.

In manner 2, the configuration information of the guard gap that has been received by the terminal is the second configuration information, and the transmit power of the terminal is greater than the preset power threshold, the configuration request is sent to the network device.

The configuration information of the guard gap that has been received by the terminal being the second configuration information may determine that the number of the guard gap currently configured by the terminal between the SRS resource sets is one.

When the transmit power of the terminal is greater than the preset power threshold, the terminal requests, by sending the configuration request to the network device, the network device to configure the terminal with a guard gap after the end timepoint of the first SRS resource set of two adjacent SRS resource sets, and a guard gap before the start timepoint of the second SRS resource set of the two adjacent SRS resource sets. This enables the terminal to switch to the antenna with the optimal performance for the achievement of signal transmission between the SRS resource sets, thereby ensuring the signal transmission between the SRS resource sets when the terminal is at the edge of the cell coverage or in the weak signal environment.

In manner 3, the configuration information of the guard gap that has been received is the first configuration information, the power headroom of the terminal is greater than the headroom threshold, and the configuration request is sent to the network device.

The configuration information of the guard gap that has been received by the terminal being the first configuration information may determine that the number of guard gaps currently configured by the terminal between the SRS resource sets is two.

When the power headroom of the terminal is greater than the headroom threshold, the terminal requests, by sending the configuration request to the network device, the network device to configure the terminal with only one guard gap between two adjacent SRS resource sets, which reduces the waste of time domain resources between the SRS resource sets.

In manner 4, the configuration information of the guard gap that has been received is the second configuration information, the transmit power of the terminal is less than or equal to the headroom threshold, and the configuration request is sent to the network device.

The configuration information of the guard gap that has been received by the terminal being the second configuration information may determine that the number of the guard gap currently configured by the terminal between the SRS resource sets is one.

When the transmit power of the terminal is less than or equal to the headroom threshold, the terminal requests, by sending the configuration request to the network device, the network device to configure the terminal with a guard gap after the end timepoint of the first SRS resource set of two adjacent SRS resource sets, and a guard gap before the start timepoint of the second SRS resource set of the two adjacent SRS resource sets. This enables the terminal to switch to the antenna with the optimal performance for the achievement of signal transmission between the SRS resource sets, thereby ensuring the signal transmission between the SRS resource sets when the terminal is at the edge of the cell coverage or in the weak signal environment.

Next, taking the network device being a base station as an example, the guard gap configuration method provided by the present disclosure is described in connection with specific embodiments.

The embodiments of the present disclosure provide a guard gap configuration method, including the following examples 1 to 3.

Example 1

The base station side at least may configure two configuration schemes of the SRS antenna switching guard gap for the terminal, and the base station dynamically configures, based on the channel environment in which the terminal is located, the configuration scheme of the SRS antenna switching guard gap for the terminal.

In an embodiment, the configuration scheme includes the configuration scheme of the guard gap as shown in the accompanying FIG. 2*a*, and the configuration scheme of the guard gap as shown in the accompanying FIG. 2*c*.

In an embodiment, dynamically configuring for the terminal, by the base station based on the channel environment in which the terminal is located, the configuration scheme of the SRS antenna switching guard gap includes:

when the base station measures that the channel quality of the terminal is less than the preset quality threshold, and the number of symbols between the SRS resource sets is greater than a preset value, configuring for the terminal, by the base station, the configuration scheme of the guard gap as shown in the accompanying FIG. 2*c*.

When the number of symbols between the SRS resource sets is less than or equal to the preset value, the configuration scheme of the guard gap as shown in the accompanying FIG. 2*a* is configured.

Example 2

The base station side by default configures the configuration scheme of the guard gap as shown in FIG. 2*a* for the terminal. The terminal detects that the transmit power is greater than the preset power threshold, and requests an additional configuration scheme from the base station, such as the configuration scheme of the guard gap as shown in FIG. 2*c*. After the base station feeds back the consent, the terminal uses the configuration scheme of the guard gap as shown in FIG. 2*c* for the configuration of the guard gap between the SRS resource sets.

Example 3

The base station side by default configures the configuration scheme of the guard gap as shown in FIG. 2*c* for the terminal. The terminal detects that the transmit power is less than the preset power threshold, and requests an additional configuration scheme from the base station, such as the configuration scheme of the guard gap as shown in FIG. 2*a*. After the base station feeds back the consent, the terminal uses the configuration scheme of the guard gap as shown in FIG. 2*a* for the configuration of the guard gap between the SRS resource sets.

The following are apparatus embodiments of the present disclosure, which may be configured to perform the corresponding method embodiments of the present disclosure. For details not disclosed in the apparatus embodiments of the present disclosure, please refer to the corresponding method embodiments of the present disclosure.

Figure 7:
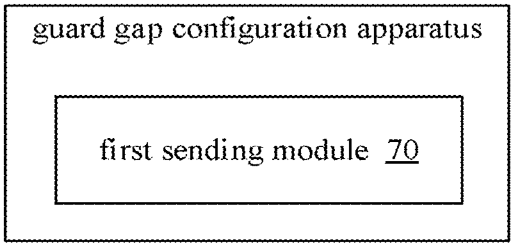
FIG. 7 is a schematic structural diagram of a guard gap configuration apparatus illustrated according to an exemplary embodiment.

FIG. 7 is a block diagram of a guard gap configuration apparatus applied to a network device side illustrated according to an exemplary embodiment. As shown in FIG. 7, the guard gap configuration apparatus may be implemented, through hardware or a combination of software and hardware, as all or part of the network device in the wireless communication system shown in FIG. 1. The guard gap configuration apparatus may include:

a first sending module 70, configured to send, based on at least one of channel quality, transmit power information of a terminal, and a configuration request of the terminal, configuration information of a guard gap to the terminal, where the configuration information is used for determining the guard gap between SRS resource sets, and the configuration request is determined by the terminal based on the transmit power information of the terminal.

In an embodiment, the configuration information includes:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets;

second configuration information, where the second configuration information is different from the first configuration information.

In an embodiment, the second configuration information is used for indicating that a guard gap is configured before the start timepoint of the second SRS resource set of the two adjacent ones of the SRS resource sets, or is configured after the end timepoint of the first SRS resource set of the two adjacent ones of the SRS resource sets.

In an embodiment, the first sending module 70 is configured to:

send, based on a number of a time domain unit between the SRS resource sets and at least one of the channel quality, the transmit power information of the terminal, and the configuration request of the terminal, the configuration information of the guard gap to the terminal.

In an embodiment, the first sending module 70 is configured to perform at least one of:

if the channel quality is less than a quality threshold, and the number of the time domain unit between the SRS resource sets is greater than a number threshold, send the first configuration information to the terminal;

if the channel quality is greater than or equal to the quality threshold, send the second configuration information to the terminal; and if the number of the time domain unit between the SRS resource sets is less than or equal to the number threshold, send the second configuration information to the terminal.

In an embodiment, the first sending module 70 is configured to perform at least one of:

if transmit power of the terminal is greater than a preset power threshold, and the number of the time domain unit between the SRS resource sets is greater than a number threshold, send the first configuration information to the terminal;

if the transmit power of the terminal is less than or equal to the preset power threshold, send the second configuration information to the terminal;

if power headroom of the terminal is less than or equal to a headroom threshold, and the number of the time domain unit between the SRS resource sets is greater than the number threshold, send the first configuration information to the terminal; and if the power headroom of the terminal is greater than the headroom threshold, send the second configuration information to the terminal.

In an embodiment, the first sending module 70 is configured to perform at least one of:

when the number of the time domain unit between the SRS resource sets is greater than a number threshold, send, based on the configuration request, the first configuration information to the terminal; and when the number of the time domain unit between the SRS resource sets is less than or equal to the number threshold, send, based on the configuration request, the second configuration information to the terminal.

In an embodiment, the first sending module 70 is configured to:

send to the terminal, based on the configuration request and according to configuration information of the guard gap that has been sent to the terminal, the configuration information of the guard gap that has not been provided to the terminal.

In an embodiment, the first sending module 70 is configured to:

in response to having sent to the terminal the first configuration information of the guard gap, send to the terminal, based on the configuration request, the second configuration information of the guard gap that has not been provided to the terminal; and in response to having sent to the terminal the second configuration information of the guard gap, send to the terminal, based on the configuration request, the first configuration information of the guard gap that has not been provided to the terminal.

Figure 8:
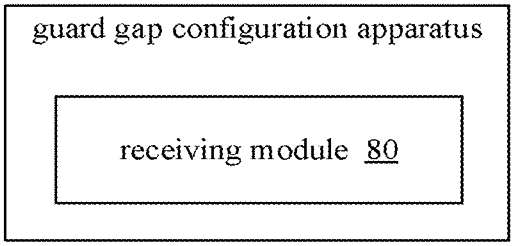
FIG. 8 is a schematic structural diagram of a guard gap configuration apparatus illustrated according to an exemplary embodiment.

FIG. 8 is a block diagram of a guard gap configuration apparatus applied to a terminal illustrated according to an exemplary embodiment. As shown in FIG. 8, the guard gap configuration apparatus may be implemented, through hardware or a combination of software and hardware, as all or part of the terminal in the wireless communication system shown in FIG. 1. The guard gap configuration apparatus may include:

a receiving module 80, configured to receive configuration information of a guard gap sent by a network device based on at least one of channel quality, transmit power information of the terminal, and a configuration request of the terminal, where the configuration information is used for determining the guard gap between SRS resource sets, and the configuration request is determined by the terminal based on the transmit power information of the terminal.

In an embodiment, the configuration information includes:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets;

second configuration information, where the second configuration information is different from the first configuration information.

In an embodiment, the second configuration information is used for indicating that a guard gap is configured before the start timepoint of the second SRS resource set of the two adjacent ones of the SRS resource sets, or is configured after the end timepoint of the first SRS resource set of the two adjacent ones of the SRS resource sets.

In an embodiment, the receiving module 80 is configured to:

receive the configuration information of the guard gap sent by the network device based on a number of a time domain unit between the SRS resource sets and at least one of the channel quality, the transmit power information of the terminal, and the configuration request of the terminal.

In an embodiment, the apparatus further includes:

a second sending module, configured to send the transmit power information of the terminal to the network device, where the transmit power information is used by the network device to determine the configuration information of the guard gap sent to the terminal.

In an embodiment, the apparatus further includes:

a third sending module, configured to send to the network device the configuration request determined based on the transmit power information of the terminal.

In an embodiment, the third sending module is configured to perform at least one of:

if configuration information of the guard gap that has been received by the terminal is the first configuration information, and transmit power of the terminal is less than or equal to a preset power threshold, send the configuration request to the network device;

if the configuration information of the guard gap that has been received by the terminal is the second configuration information, and the transmit power of the terminal is greater than the preset power threshold, send the configuration request to the network device;

if the configuration information of the guard gap that has been received by the terminal is the first configuration information, and power headroom of the terminal is greater than a headroom threshold, send the configuration request to the network device; and if the configuration information of the guard gap that has been received by the terminal is the second configuration information, and the transmit power of the terminal is less than or equal to the headroom threshold, send the configuration request to the network device.

The embodiments of the present disclosure provide a communication device, including a processor, a memory and an executable program stored in the memory and capable of being run by the processor. The processor, when running the executable program, performs the guard gap configuration method provided in any of the foregoing technical solution.

The processor may include various types of storage media. The storage media are non-transitory computer storage media. After the communication device loses power, the storage media can continue to memorize and store information thereon.

Here, the communication device includes a terminal or a network device.

The processor may be connected to the memory through a bus or other means for reading the executable program stored in the memory, such as at least one of the guard gap configuration methods shown in FIGS. 3 to 6.

Figure 9:
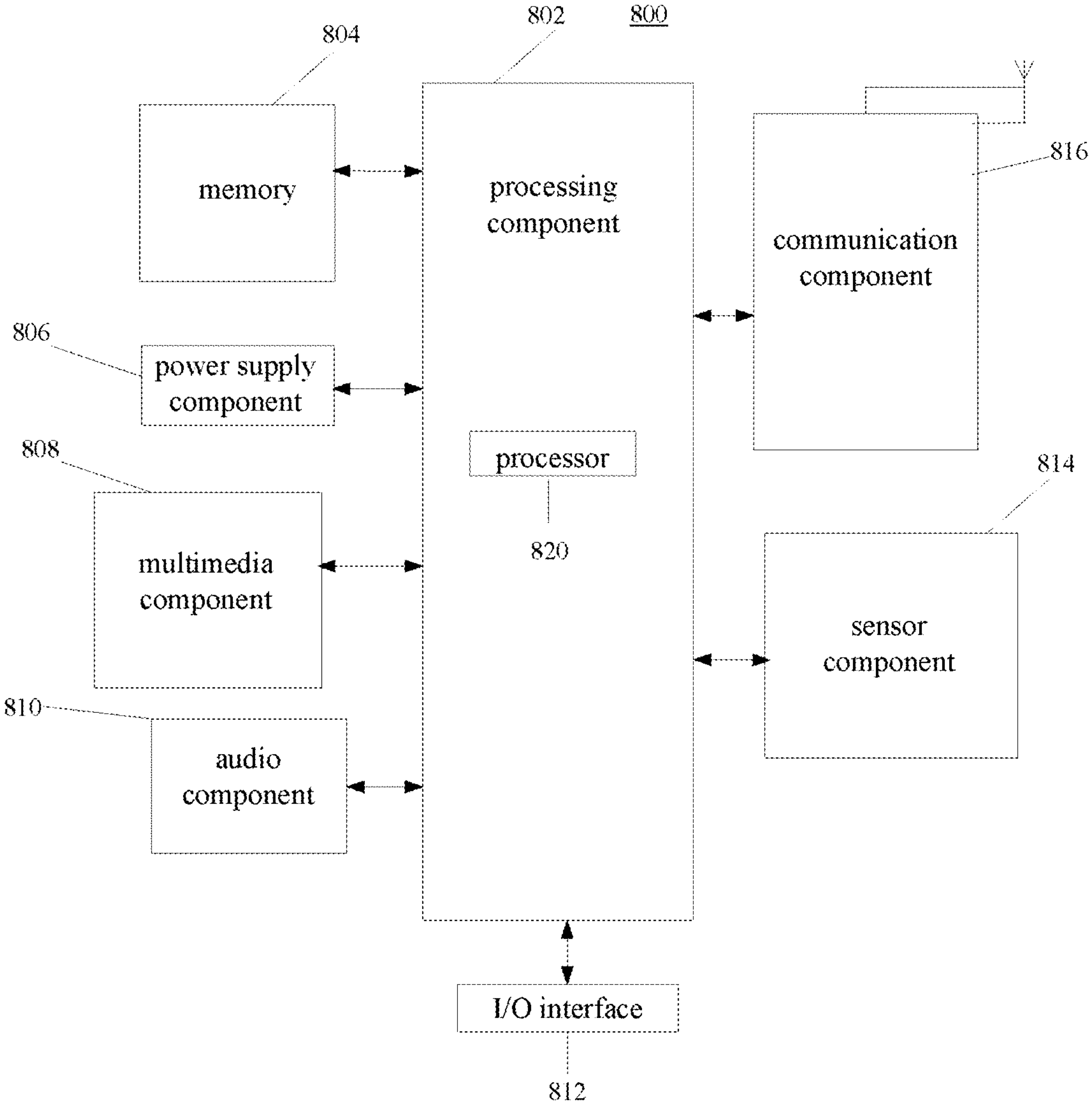
FIG. 9 is a schematic structural diagram of a terminal illustrated according to an exemplary embodiment.

FIG. 9 is a block diagram of a terminal illustrated according to an exemplary embodiment. For example, the terminal 800 may be a mobile phone, a computer, a digital broadcast user equipment, a message transceiver device, a game console, a tablet device, a medical device, a fitness device, or a personal digital assistant.

Referring to FIG. 9, the terminal 800 may include one or more of the following components: a processing component 802, a memory 804, a power supply component 806, a multimedia component 808, an audio component 810, an input/output (I/O) interface 812, a sensor component 814, and a communication component 816.

The processing component 802 generally controls the overall operation of the terminal 800, such as operations associated with display, telephone calls, data communication, camera operations, and recording operations. The processing component 802 may include one or more processors 820 to execute instructions to generate all or part of the steps of the method described above. In addition, the processing component 802 may include one or more modules that facilitate interaction between the processing component 802 and other components. For example, the processing component 802 may include a multimedia module to facilitate interaction between the multimedia component 808 and the processing component 802.

The memory 804 is configured to store various types of data to support the operations at the terminal 800. Examples of such data include the following: instructions of any application program or method operated on the terminal 800, contact data, phonebook data, messages, pictures, videos, etc. The memory 804 may be implemented by any type of volatile or non-volatile storage device or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a disk, or a CD-ROM.

The power supply component 806 supplies power to various components of the terminal 800. The power supply component 806 may include a power supply management system, one or more power supplies, and other components associated with generating, managing, and distributing power for the terminal 800.

The multimedia component 808 includes a screen that provides an output interface between the terminal 800 and a user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensor may not only sense the boundaries of the touch or swipe action, but also detect the duration and pressure associated with the touch or swipe operation. In an embodiment, the multimedia component 808 includes a front-facing camera and/or a rear-facing camera. The front-facing camera and/or the rear-facing camera may receive external multimedia data when the terminal 800 is in an operating mode, such as a shooting mode or a video mode. Each of the front-facing camera and the rear-facing camera may be a fixed optical lens system or have a focal length and optical zoom capability.

The audio component 810 is configured to output and/or input audio signals. For example, the audio component 810 includes a microphone (MIC), configured to receive external audio signals when the terminal 800 is in an operating mode, such as a calling mode, a recording mode, and a voice recognition mode. The received audio signals may be further stored in the memory 804 or sent via the communication component 816. In an embodiment, the audio component 810 further includes a speaker for outputting the audio signals.

The I/O interface 812 provides an interface between the processing component 802 and a peripheral interface module, and the peripheral interface module may be a keypad, a click wheel, a button, etc. These buttons may include, but are not limited to, a home button, a volume button, a start button, and a lock button.

The sensor component 814 includes one or more sensors configured to provide status assessment of various aspects of the terminal 800. For example, the sensor component 814 may detect an open/closed state of the device 800, relative positioning of the components, for example, the components are the display and small keypad of the terminal 800, the sensor component 814 may also detect a change in the position of the terminal 800 or a change in the position of one component of the terminal 800, the presence or absence of contact between the user and the terminal 800, the orientation or acceleration/deceleration of terminal 800, and temperature changes of the terminal 800. The sensor component 814 may include a proximity sensor that is configured to detect the presence of nearby objects in the absence of any physical contact. The sensor component 814 may also include a light sensor, such as a CMOS or CCD image sensor, for use in imaging applications. In an embodiment, the sensor component 814 may also include an accelerometer sensor, a gyroscope sensor, a magnetic sensor, a pressure sensor, or a temperature sensor.

The communication component 816 is configured to facilitate the communication between the terminal 800 and other devices by wired or wireless means. The terminal 800 may access a wireless network based on a communication standard, such as WiFi, 2G, 3G, 4G, 5G, or a combination thereof. In an exemplary embodiment, the communication component 816 receives broadcast signals or broadcast-related information from an external broadcast management system via a broadcast channel. In an exemplary embodiment, the communication component 816 further includes a near-field communication (NFC) module to facilitate short-range communication. For example, the NFC module may be implemented based on the radio frequency identification (RFID) technology, the infrared data association (IrDA) technology, the ultra-wideband (UWB) technology, the bluetooth (BT) technology, or other technologies.

In an exemplary embodiment, the terminal 800 may be implemented by one or more of: an application-specific integrated circuit (ASIC), a digital signal processor (DSP), a digital signal processing device (DSPD), a programmable logic device (PLD), a field-programmable gate array (FPGA), a controller, a microcontroller, a microprocessor, or other electronic elements, to perform at least one of the guard gap configuration methods shown in FIG. 4 to FIG. 6 described above.

In an exemplary embodiment, a non-transitory computer-readable storage medium including an instruction is provided, such as the memory 804 including an instruction. The instruction described above is capable of being executed by the processor 820 of the terminal 800 to complete any method described above applied to the terminal. For example, the non-transitory computer-readable storage medium may be an ROM, a random access memory (RAM), a CD-ROM, a magnetic tape, a floppy disk, or an optical data storage device.

Figure 10:
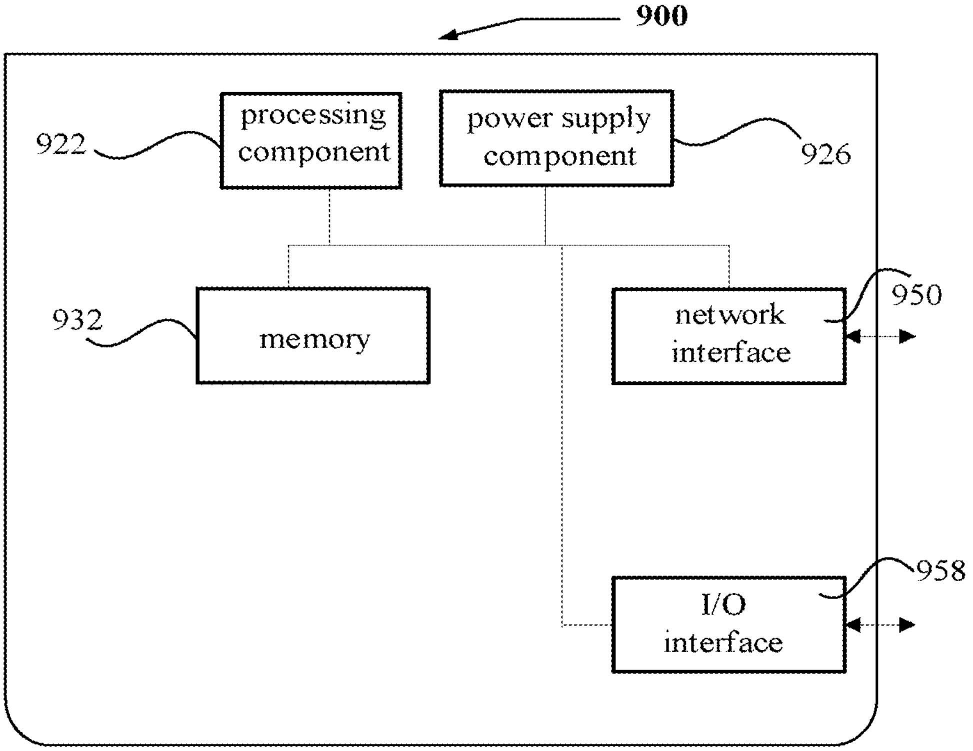
FIG. 10 is a schematic structural diagram of a network device illustrated according to an exemplary embodiment.

As shown in FIG. 10, an embodiment of the present disclosure illustrates a structure of a network device. Referring to FIG. 10, the network device 900 includes a processing component 922, where the processing component 922 further includes one or more processors, and a memory resource represented by a memory 932 for storing instructions, such as application programs, that is executable by the processing component 922. The application program stored in the memory 932 may include one or more modules each corresponding to a set of instructions. In addition, the processing component 922 is configured to execute the instructions to perform any method described above applied to the network device, e.g., the guard gap configuration method shown in FIG. 3.

The network device 900 may further include a power supply component 926 configured to perform power management of the network device 900, a wired or wireless network interface 950 configured to connect the network device 900 to the network, and an I/O interface 958. The network device 900 may operate an operating system stored in the memory 932, such as Windows Server™, Mac OS X™, Unix™, Linux™, FreeBSD™, or the like.

In an exemplary embodiment, a non-transitory computer-readable storage medium including an instruction is provided, such as the memory 932 including an instruction. The instruction described above is capable of being executed by the processor 922 of the network device 900 to complete any method described above applied to the network device. For example, the non-transitory computer-readable storage medium may be an ROM, an RAM, a CD-ROM, a magnetic tape, a floppy disk, or an optical data storage device.

After considering the specification and practicing the invention disclosed herein, those skilled in the art will easily come up with other implementation solutions of the present disclosure. The present disclosure is intended to cover any variations, uses, or adaptive changes of the present disclosure, and the variations, uses, or adaptive changes follow the general principles of the present disclosure and include common knowledge or commonly used technical means in the technical field that is not disclosed in the present disclosure. The specification and embodiments are only considered to be exemplary, and the true scope and spirit of the present disclosure are indicated by the following claims.

It should be understood that the present disclosure is not limited to the precise structure which has been described above and illustrated in the accompanying drawings, and that various modifications and alterations may be made without departing from the scope of the present disclosure. The scope of the present disclosure is limited only by the appended claims.

What is claimed is:

1. A guard gap configuration method, wherein the method is performed by a network device, and comprises:

sending, based on at least one of channel quality, transmit power information of a terminal, or a configuration request of the terminal, configuration information of a guard gap to the terminal, wherein the configuration information is used for determining the guard gap between sounding reference signal (SRS) resource sets, and the configuration request is determined by the terminal based on the transmit power information;

wherein the configuration information comprises:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets; or second configuration information, wherein the second configuration information is different from the first configuration information;

wherein the sending the configuration information of the guard gap to the terminal comprises:

sending, based on at least one of a number of a time domain unit between the SRS resource sets, the channel quality, the transmit power information of the terminal, or the configuration request of the terminal, the configuration information of the guard gap to the terminal;

wherein the sending, based on at least one of the number of the time domain unit between the SRS resource sets, the channel quality, the transmit power information of the terminal, or the configuration request of the terminal, the configuration information of the guard gap to the terminal comprises at least one of:

sending, in response to the channel quality being less than a quality threshold, and the number of the time domain unit between the SRS resource sets being greater than a number threshold, the first configuration information to the terminal;

sending, in response to the channel quality being greater than or equal to the quality threshold, the second configuration information to the terminal; or sending, in response to the number of the time domain unit between the SRS resource sets being less than or equal to the number threshold, the second configuration information to the terminal.

2. The method according to claim 1, wherein the second configuration information is used for indicating that a guard gap is configured before the start timepoint of the second SRS resource set, or is configured after the end timepoint of the first SRS resource set.

3. The method according to claim 1, wherein the sending, based on at least one of the number of the time domain unit between the SRS resource sets, the channel quality, the transmit power information of the terminal, or the configuration request of the terminal, the configuration information of the guard gap to the terminal further comprises at least one of:

sending, in response to transmit power of the terminal being greater than a preset power threshold, and the number of the time domain unit between the SRS resource sets being greater than a number threshold, the first configuration information to the terminal;

sending, in response to the transmit power of the terminal being less than or equal to the preset power threshold, the second configuration information to the terminal;

sending, in response to power headroom of the terminal being less than or equal to a headroom threshold, and the number of the time domain unit between the SRS resource sets being greater than the number threshold, the first configuration information to the terminal; or sending, in response to the power headroom of the terminal being greater than the headroom threshold, the second configuration information to the terminal.

4. The method according to claim 1, wherein the sending, based on at least one of the number of the time domain unit between the SRS resource sets, the channel quality, the transmit power information of the terminal, or the configuration request of the terminal, the configuration information of the guard gap to the terminal further comprises at least one of:

in response to the number of the time domain unit between the SRS resource sets being greater than a number threshold, sending, based on the configuration request, the first configuration information to the terminal; or in response to the number of the time domain unit between the SRS resource sets being less than or equal to the number threshold, sending, based on the configuration request, the second configuration information to the terminal.

5. The method according to claim 1, wherein the sending the configuration information of the guard gap to the terminal comprises:

sending to the terminal, based on the configuration request and configuration information of the guard gap that has been sent to the terminal, the configuration information of the guard gap that has not been provided to the terminal.

6. The method according to claim 5, wherein the sending to the terminal, based on the configuration request and the configuration information of the guard gap that has been sent to the terminal, the configuration information of the guard gap that has not been provided to the terminal comprises:

in response to having sent to the terminal the first configuration information of the guard gap, sending to the terminal, based on the configuration request, the second configuration information of the guard gap that has not been provided to the terminal; and in response to having sent to the terminal the second configuration information of the guard gap, sending to the terminal, based on the configuration request, the first configuration information of the guard gap that has not been provided to the terminal.

7. A guard gap configuration method, wherein the method is performed by a terminal, and comprises:

receiving configuration information of a guard gap sent by a network device based on at least one of channel quality, transmit power information of the terminal, or a configuration request of the terminal, wherein the configuration information is used for determining the guard gap between sounding reference signal (SRS) resource sets, and the configuration request is determined by the terminal based on the transmit power information;

wherein the configuration information comprises:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets; or second configuration information, wherein the second configuration information is different from the first configuration information;

wherein the receiving the configuration information of the guard gap sent by the network device comprises:

receiving the configuration information of the guard gap sent by the network device based on at least one of a number of a time domain unit between the SRS resource sets, the channel quality, the transmit power information of the terminal, or the configuration request of the terminal;

wherein the receiving the configuration information of the guard gap sent by the network device based on at least one of the number of a time domain unit between the SRS resource sets, the channel quality, the transmit power information of the terminal, or the configuration request of the terminal comprises at least one of:

receiving, in response to the channel quality being less than a quality threshold, and the number of the time domain unit between the SRS resource sets being greater than a number threshold, the first configuration information sent by the network device;

receiving, in response to the channel quality being greater than or equal to the quality threshold, the second configuration information sent by the network device; or receiving, in response to the number of the time domain unit between the SRS resource sets being less than or equal to the number threshold, the second configuration information sent by the network device.

8. The method according to claim 7, wherein the second configuration information is used for indicating that a guard gap is configured before the start timepoint of the second SRS resource set, or is configured after the end timepoint of the first SRS resource set.

9. The method according to claim 7, further comprising:

sending the transmit power information of the terminal to the network device, wherein the transmit power information is used by the network device to determine the configuration information of the guard gap.

10. The method according to claim 7, further comprising:

sending to the network device the configuration request determined based on the transmit power information of the terminal.

11. The method according to claim 10, wherein the sending to the network device the configuration request comprises at least one of:

in response to configuration information of the guard gap that has been received by the terminal being the first configuration information, and transmit power of the terminal being less than or equal to a preset power threshold, sending the configuration request to the network device;

in response to the configuration information of the guard gap that has been received by the terminal being the second configuration information, and the transmit power of the terminal being greater than the preset power threshold, sending the configuration request to the network device;

in response to the configuration information of the guard gap that has been received by the terminal being the first configuration information, and power headroom of the terminal being greater than a headroom threshold, sending the configuration request to the network device; or in response to the configuration information of the guard gap that has been received by the terminal being the second configuration information, and the transmit power of the terminal being less than or equal to the headroom threshold, sending the configuration request to the network device.

12. A communication device, comprising:

a processor; and a memory, storing an executable program capable of being run by the processor, wherein the processor, through running the executable program, is configured to:

send, based on at least one of channel quality, transmit power information of a terminal, or a configuration request of the terminal, configuration information of a guard gap to the terminal, wherein the configuration information is used for determining the guard gap between sounding reference signal (SRS) resource sets, and the configuration request is determined by the terminal based on the transmit power information;

wherein the configuration information comprises:

first configuration information, used for indicating that a guard gap is configured after an end timepoint of a first SRS resource set of two adjacent ones of the SRS resource sets, and a guard gap is configured before a start timepoint of a second SRS resource set of the two adjacent ones of the SRS resource sets; or second configuration information, wherein the second configuration information is different from the first configuration information;

wherein the processor is further configured to:

send, in response to the channel quality being less than a quality threshold, and a number of a time domain unit between the SRS resource sets being greater than a number threshold, the first configuration information to the terminal;

send, in response to the channel quality being greater than or equal to the quality threshold, the second configuration information to the terminal; or send, in response to the number of the time domain unit between the SRS resource sets being less than or equal to the number threshold, the second configuration information to the terminal.

13. A non-transitory computer storage medium, storing an executable program, wherein the executable program, when executed by a processor, causes the processor to perform the guard gap configuration method according to claim 1.

14. A communication device, comprising:

a processor; and a memory, storing an executable program capable of being run by the processor, wherein the processor, through running the executable program, is configured to perform the guard gap configuration method according to claim 7.

15. A non-transitory computer storage medium, storing an executable program, wherein the executable program, when executed by a processor, causes the processor to perform the guard gap configuration method according to claim 7.

* * * * *